United States Patent Office 3,402,048
Patented Sept. 17, 1968

3,402,048
PROCESS FOR PRODUCING BEER OF
THE VOLLBIER TYPE
Theo Hank, St. Ingbert (Saar), Germany, assignor to
Bierbrauerei Becker OHG, St. Ingbert (Saar), Germany, a German company
No Drawing. Filed Aug. 30, 1965, Ser. No. 483,782
Claims priority, application Germany, Sept. 1, 1964,
B 78,344
8 Claims. (Cl. 99—31)

The present invention relates to a stable and storable beer of the category known in Germany as "Vollbier," i.e. a beer with a content of original extract of 11.0°P to 14.0°P and to a process of brewing such beer.

Beer is conventionally brewed by fermentation of a farinaceous extract obtained from a starchy raw material, barley which is used in the form of malt. To brew a beer according to known processes so that it is sufficiently stable and storable, it is subjected to a stabilization and pasteurization process. Such a process of stabilization and pasteurization, however, need not be applied to "Vollbier" with an alcohol content of, for instance, 2.5% or less.

It is one object of the present invention to provide a stable and storable beer of the "Vollbier" type of a low alcohol content of about 2.5% or less which corresponds in its taste to a beer brewed according to conventional brewing methods.

It is another object of the present invention to provide a simple and effective process of producing such a stable and storable beer of the "Vollbier" type.

Other objects of the present invention and advantageous features thereof will become apparent as the description proceeds.

In principle the process of brewing a highly stable and storable beer of the "Volbier" type of a low alcohol content according to the present invention comprises subdividing the brewing step, i.e. the step comprising mashing, straining, and wort boiling, into two brewing stages. The first brewing stage consists in the so-called pre-brewing process in which the entire required amount of acid malt and hops required for producing the beer is added to the wort. The second brewing stage, the after-brewing process, does not require an addition of acid malt and hops. However, before combining the pre-brew with the after-brew a certain amount of an adsorbent is added to the after-brew in order to achieve substantial stabilization of the resulting beer. Pre-brew and after-brew may be mixed in any desired proportion thereby varying the alcohol content of the resulting beer.

The first step of this subdivided brewing process corresponds in general to the known, conventional brewing process.

Any known mashing process may be employed in producing the pre-wort or first wort and the after-wort or second wort. The preferred mashing temperature, i.e. saccharification temperature especially in the preparation of the pre-wort is a temperature of at least 72° C. (max. 74° C.), i.e. a temperature which is considerably higher than the saccharification temperature of the known mashing processes.

The resulting first wort is then boiled with the hops, preferably with a relatively high amount of hops, for instance, with about 540 g. of hops per 100 l. of wort. The amount of hops added depends, of course, upon the beer to be brewed and the desired taste of the beer and may be higher or lower than 540 g./100 l. According to a preferred embodiment of this invention about 50% of the amount of hops to be added may be in the form of a hop extract substantially free of, or poor in, tannin. Preferably the hop extract is pre-concentrated to five to six times its original concentration. In this manner a first wort with a rather low tannin content is obtained.

The yeast required for primary fermentation of the first wort is added in an amount smaller than usually employed. For instance, it may be carried out with 30% less than the required amount of bottom yeast. Therefore, fermentation of the first wort proceeds so slowly that only a relatively small amount of the sugar present in the first wort is fermented. As a result thereof, the alcohol content of the wort after primary fermentation is lower than the normally produced alcohol content and the remaining yeast at the end of the primary fermentation is so low that only slight secondary or final fermentation (end fermentation) takes place during lagering. Thereby, the resulting first brew is ripened and its taste and aroma are considerably improved.

The preferred procedure is to add about 30% less of bottom yeast than required and to carry out the primary fermentation at a temperature not exceeding 7° C. for twelve and a quarter days. The fermented sugar amounts then to about 70%. The alcohol content is about 3% at the end of the primary fermentation.

As stated above, acid malt is added to the boiled wort before primary fermentation. Such acid malt is malt steeped in lactic acid. Its lactic acid content is, for instance, at about 3.5%. The lactic acid used in this process is preferably made biologically, for instance, by acidifying wort with Lactobac. Delbrueckii. The amount of acid malt added to the first wort may be about 2.5% although larger or smaller amounts may also be used.

The second or after-wort which is subsequently added to the fermented first or pre-wort is mixed with the adsorbent while stirring vigorously by means of a stirring device especially designed therefor for a predetermined period of time. A suitable stirrer is, for instance, a propeller attached to a shaft and rotating with 600 r.p.m. to 800 r.p.m. Such vigorous stirring is continued for seven hours to twelve hours and causes continual contact of the adsorbent particles with the second wort. After cooling the second or after-wort and before mixing it with the fermented first wort, no fermentation of this second wort takes place since no yeast has been added.

The second or after-wort is boiled, filtered, and cooled and then conveyed to a storing tank.

Boiling of the first and second wort before fermentation is effected, as usually done, at boiling temperature under atmospheric pressure.

Such boiling, as is well known, has for its purpose to evaporate a suitable amount of the sparging water used in separating the wort from the spent grain, to bring about precipitation of the sludge, i.e. coagulation of the proteins, and, when the first wort is boiled with hops to dissolve the bitter substances of the hops in the first wort.

Before the second or after-wort is mixed with the fermented first or pre-wort, a small amount of yeast as required to cause secondary fermentation is added thereto. The yeast is preferably added in the form of 0.2 l./100 l. of an aqueous bottom yeast settled in the form of a thick paste. Its addition to the second or non-fermented after-wort shortly before mixing with the pre-fermented first wort improves secondary fermentation in the mixture of first and second wort. Thereby, about 2% of sugar are fermented in the mixture.

During mixing of the first and second wort it is advisable to also add small amounts of an adsorbent, for instance, 100 g./100 l. This addition further improves the stability of the brewed beer.

Suitable adsorbents to be added to the second or after-wort as well as during mixing of pre-fermented first wort and after-wort are, for instance, bentonites, suitable silicate compounds, activated charcoal, or other conventional adsorbents which do not affect taste and aroma of the beer.

On lagering the resulting beer, it is the preferred procedure to keep the beer under a pressure of at least 0.6 atmospheres gauge at a temperature of about 0° C., preferably of −1° C. from the beginning to the end of the entire lagering process. As a result thereof the beer contains 0.1%, by weight, of carbon dioxide and even more than the normally brewed beer types. This higher carbon dioxide content considerably improves the biological stability of the beer, its taste and aroma, and also its foam stabilizing capacity due to the higher protein content.

The above described specific brewing process according to the present invention thus permits brewing of a pale beer of a wort content between 11°P and 14°P known as "Vollbier" and of a low alcohol content of only 2.5% alcohol or even less. Such a low alcohol beer substantially corresponds in its taste and aroma to beer produced according to heretofore used brewing methods. Such pale beer according to the present invention, even if it has an alcohol content below 2.5%, need not be pasteurized to assure its biological stability. In contrast thereto, beer of a low alcohol content as produced heretofore must be pasteurized. Thus the process of this invention does not require any short time heating, hot bottling, or pasteurization but can be carried out at a low temperature starting with the fermentation step. Beer brewed according to the present invention has the further advantageous property that it does not become cloudy due to protein precipitation and/or to cold temperatures even on storage for about one year.

The following examples serve to illustrate the present invention without, however, limiting the same thereto.

EXAMPLE 1

A mash is obtained by mashing 4000 kg. of crushed barley malt and about 15000 l. of water at a pH of about 5.0 to 5.4 and a temperature of about 72° C., separating the wort from the spent grain, and washing out the extract remaining in the filtered spent grain by sparging. The resulting wort is subdivided into two equal parts.

To the first half of the wort, i.e. to 25,000 l., there are added 2.5% of said malt, i.e. a malt to which 3.5% of lactic acid has been added, and 540 g. of hops per 100 l. This mixture is boiled for about 2 hours to a volume of 25,000 l.

The resulting boiled and cooled wort is fermented by means of bottom yeast which is added in an amount of 75 l. of a thick paste of yeast, i.e. with 0.3 l. of yeast per 100 l. of wort. Fermentation is carried out at a temperature not exceeding 7° C. until about 70% of the sugar present in the wort has been fermented. The resulting fermented first wort has an alcohol content of about 3%.

The second half of the wort, i.e. 25,000 l, is boiled for two hours without the addition of hops and acid malt to a volume of 25,000 l. and is then cooled and stirred with 5000 g. of bentonite, i.e. 200 g./100 l., for 10 hours, whereby the mixture is stirred with a propeller stirrer at 700 r.p.m. Thereafter, the adsorbent is removed by filtration and 50 l. of a thick paste of bottom yeast, i.e. 0.1 l. of yeast per 100 l. of wort are added to the second wort. The second wort is then admixed to the fermented first wort. The mixture which has an alcohol content of about 1.5% is subjected to final or end fermentation in the lagering tanks at a temperature of about −1° C. until the alcohol content of the beer has increased to about 2.5%. The pressure in the lagering vessels and the lager cellar tanks is about 0.4 atmospheres gauge. The beer, after lagering and final termentation has been completed, is filtered and further processed by racking, bottling, or canning in a manner known per se. The beer is of excellent biological stability, foam formation and foam stability, taste and aroma, and need not be pasteurized.

EXAMPLE 2

The procedure is the same as described hereinabove in Example 1 whereby, however, 1 part of fermented first wort and 2 parts of unfermented, adsorbent-treated second wort are mixed to yield a mixture with an alcohol content of 1%. Final or end fermentation increases the alcohol content of the resulting beer to about 1.5%. The beer has the same valuable properties as the beer obtained according to Example 1 and need not be pasteurized.

Of course, many changes and variations in the preparation of the first and second wort, in the adsorbent used, the manner in which boiling of the wort and its fermentation are carried out, and the like may be made by those skilled in this art in accordance with the principles set forth herein and in the claims annexed thereto.

I claim:
1. In a process of producing a stable beer of the "Vollbier" type, the steps which comprise
   (a) subdividing the wort into a first wort and a second wort,
   (b) boiling the first wort with an amount of hops and acidified malt as required for the entire wort,
   (c) fermenting the boiled first wort,
   (d) boiling the second wort without addition of hops and acidified malt,
   (e) treating the second wort with an adsorbent,
   (f) mixing the fermented first wort with the adsorbent-treated second wort, and
   (g) subjecting the mixture to final fermentation.
2. The process according to claim 1, wherein mashing of the wort is effected at a saccharification temperature of between 72° C. and 74° C.
3. The process according to claim 1, wherein the amount of hops added to the first wort is at least 540 g./100 l. of cooled first wort.
4. The process according to claim 1, wherein the amount of yeast added for fermenting the boiled first wort is insufficient to ferment all the fermentable sugar in said first wort so that primary fermentation of the first wort proceeds slowly, the alcohol content of the resulting beer is lower than usually produced, and the amount of yeast at the end of the primary fermentation is so low that only slight final fermentation takes place during lagering.
5. The process according to claim 1, wherein the adsorbent is stirred vigorously in the boiled second wort for a predetermined, prolonged period of time, preferably for 7–12 hours.
6. The process according to claim 1, wherein an amount of yeast as required for final fermentation is added to the second wort before mixing with the fermented first wort.
7. The process according to claim 1, wherein adsorbent is added during mixing of the adsorbent-treated second wort with the fermented first wort.
8. The process according to claim 1, wherein lagering and final fermentation of the mixture of fermented first wort and adsorbent-treated second wort is carried out while maintaining a pressure of at least 0.6 atmosphere gauge and a temperature of about 0° C.

References Cited

UNITED STATES PATENTS

| | | | |
|---|---|---|---|
| 159,716 | 2/1875 | Stuber et al. | 99—36 |
| 1,163,454 | 12/1915 | Rach | 99—38 |
| 1,994,494 | 3/1935 | Wallerstein | 99—36 |
| 2,442,806 | 6/1948 | Gluek | 99—36 |

FOREIGN PATENTS 737,004   9/1955   Great Britain.

ALVIN E. TANENHOLTZ, *Primary Examiner.*

D. M. NAFF, *Assistant Examiner.*